(No Model.)
C. L. COFFIN.
WELDING METALS ELECTRICALLY.
No. 437,570. Patented Sept. 30, 1890.
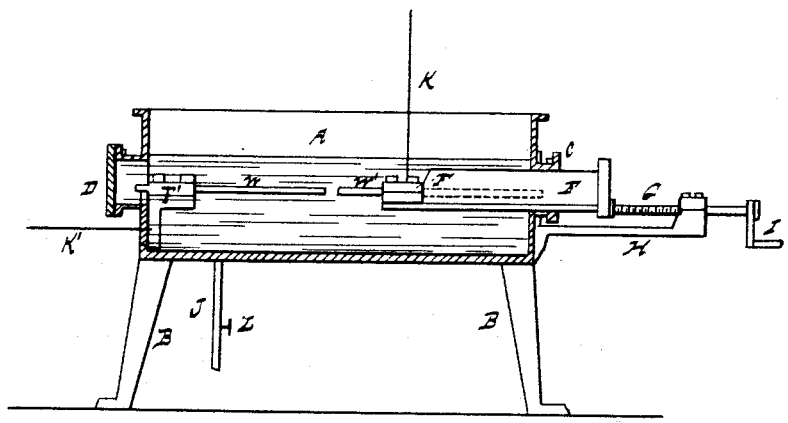
Witnesses
Geo. H. Lothrop
J. A. Rutherford
Inventor
Charles L. Coffin

UNITED STATES PATENT OFFICE.

CHARLES L. COFFIN, OF DETROIT, MICHIGAN.

WELDING METALS ELECTRICALLY.

SPECIFICATION forming part of Letters Patent No. 437,570, dated September 30, 1890.

Application filed November 22, 1889. Serial No. 331,265. (No model.)

*To all whom it may concern:*

Be it known that I, CHARLES L. COFFIN, of Detroit, in the county of Wayne and State of Michigan, have invented a new and useful Improvement in Welding Metals Electrically, of which the following is a specification.

My invention consists in welding metals electrically, and consisting in performing the welding operation under water.

The drawing is a vertical section of an apparatus which may be used to practice my invention in one of the known modes—viz., that one consisting in heating the articles to be welded by passing a current through them and pressing them together.

A represents a box supported on legs B.

C represents a stuffing-box, through which slides a tight box E, carrying on its end a clamp F, insulated from the box E to hold one of the articles W' to be welded.

F' represents a clamp secured to one end of the box A and insulated therefrom to hold the other article W to be welded.

D represents a man-hole provided with a tight-fitting cover, through which the article W may be passed into the box A.

K and K' represent electrical conductors, which connect the poles of an electrical generator with the clamps F and F'.

H represents a bracket secured to the end of box A, having thereon a screw-nut, in which meshes a screw G, provided with a crank I, by which the box E may be moved in either direction.

J represents a waste-pipe having therein a valve L, through which the liquid in box A may be drawn off.

The operation of my invention is as follows: The articles W W' being set in the clamps F' F, the box A is filled with water, so as to submerge W W', as indicated in the drawing. The ends of W W' are now brought in contact and an electric current passed through W W' by means of conductors K K', and the ends of W W' are heated either by the current when in contact or by being slightly separated, so as to form a voltaic arc between them, and when brought to a welding heat the weld is formed by pressing W' against W by means of a screw G. The water retards the formation of oxides and scales upon and within the two pieces of metal which are being operated upon and also materially increases the effect of the current.

I have described and illustrated my invention as applied to those modes of electric welding in which both articles to be welded are connected with the poles of the generator; but it is evident that it is equally applicable to the other well-known modes, in one of which a voltaic arc is sprung between the article to be welded and an extraneous conductor, as shown in the patent to Bernardos, and in the other an arc is sprung between two extraneous conductors, as shown in one of my former patents.

What I claim as my invention, and desire to secure by Letters Patent, is—

The process herein described of electric welding, which consists in immersing the articles to be welded in water, heating them electrically, and pressing them together to form a weld, substantially as set forth.

CHARLES L. COFFIN.

Witnesses:
GEO. H. LOTHROP,
GERTRUDE ANDERSON.